United States Patent [19]

Liatti

[11] Patent Number: 5,664,687

[45] Date of Patent: Sep. 9, 1997

[54] RETRACTABLE BICYCLE RACK AND METHOD OF USING SAME

[76] Inventor: Jeff Liatti, 13693 Berkley Ct., Fontana, Calif. 92336

[21] Appl. No.: 327,978

[22] Filed: Oct. 24, 1994

[51] Int. Cl.⁶ .................................................. A47F 5/00
[52] U.S. Cl. .................... 211/17; 211/118; 248/292.11; 248/324
[58] Field of Search ........................... 211/17, 118, 198; 248/317, 292.11, 610, 324, 592, 580

[56] References Cited

U.S. PATENT DOCUMENTS

| | | | |
|---|---|---|---|
| 557,567 | 4/1896 | Eddy | 211/17 |
| 569,289 | 10/1896 | Lynch. | |
| 3,770,133 | 11/1973 | Kolker | 211/19 |
| 3,782,559 | 1/1974 | Wright | 211/17 |
| 3,872,972 | 3/1975 | Cummins et al. | 211/17 |
| 3,924,751 | 12/1975 | Ballenger | 211/17 |
| 4,116,341 | 9/1978 | Hebda | 211/17 |
| 4,392,572 | 7/1983 | Bernard | 211/19 |
| 5,011,029 | 4/1991 | Sugasawara et al. | 248/292.1 |
| 5,125,517 | 6/1992 | Martinell | 211/18 |
| 5,169,042 | 12/1992 | Ching | 224/42.45 R |
| 5,292,009 | 3/1994 | Smith | 211/20 |
| 5,332,104 | 7/1994 | Santella | 211/18 |
| 5,354,035 | 10/1994 | Helgren | 211/18 X |
| 5,474,189 | 12/1995 | Peterson | 211/17 X |

*Primary Examiner*—Robert W. Gibson, Jr.
*Attorney, Agent, or Firm*—Howard A. Kenyon

[57] ABSTRACT

A retractable bicycle rack is described having a movable portion and a fixed portion. The fixed portion is attached to an overhead member such as those found in an automobile garage. The movable portion, when moved from the horizontal position to the vertical position activates compression springs attached between the movable portion and the fixed portion tithe frame. The springs have an over-center position when the rack is placed in the full vertical position which holds the rack in a vertical position. When the bicycle or bicycles are placed on the movable portion of the rack, the spring force in the compression spring moves the rack from the vertical position to the horizontal position. A draper controls the movement from the vertical position to the horizontal position. The preferred embodiment is desired for two bicycles, however, if more than two bicycles are desired, the compression spring may adjusted to provide a stronger compression force. Adjustments are also available to accommodate smaller or children's bicycles.

15 Claims, 2 Drawing Sheets

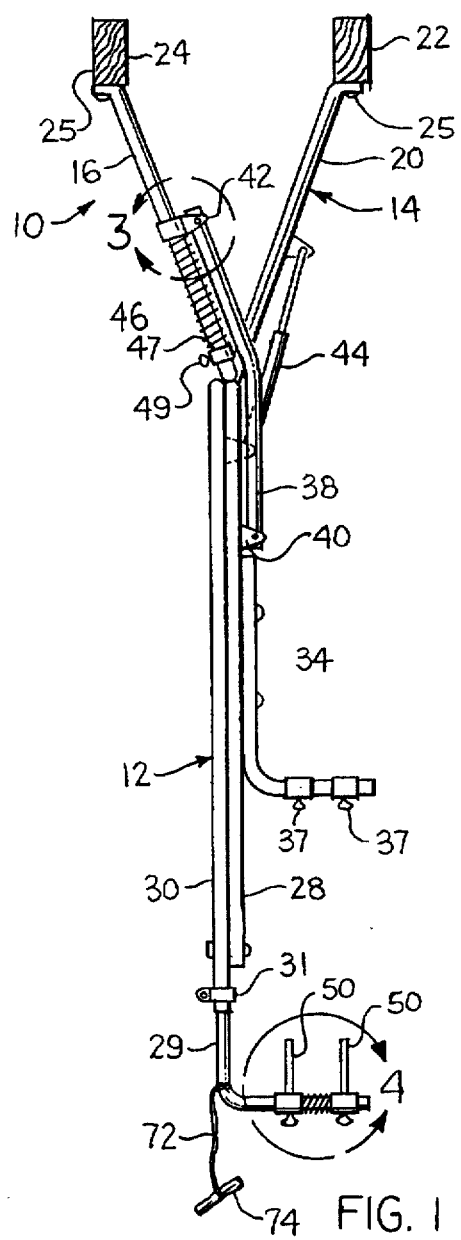
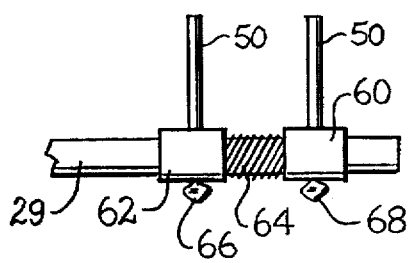
FIG. 1
FIG. 4
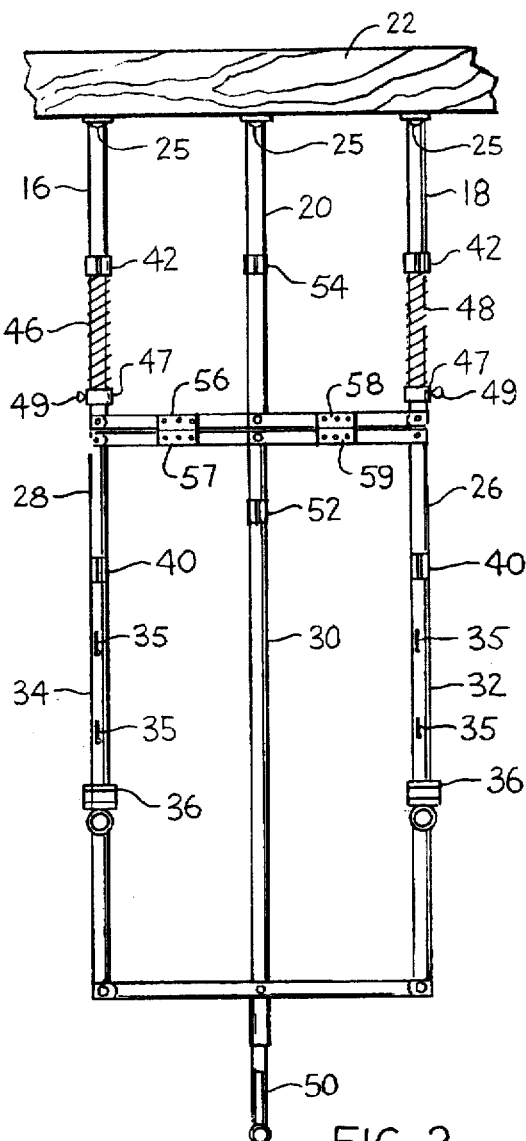
FIG. 2
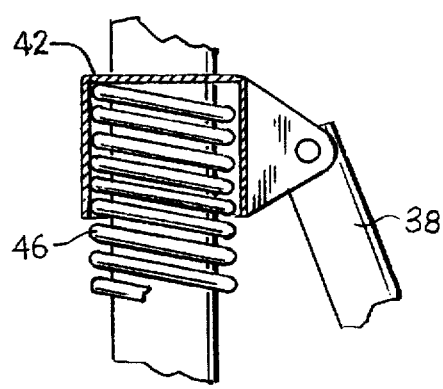
FIG. 3

5,664,687

RETRACTABLE BICYCLE RACK AND METHOD OF USING SAME

FIELD OF THE INVENTION

This invention relates to a retractable bicycle rack and more specifically a bicycle rack that uses the power of a spring force to move the bicycle rack from a vertical position to a horizontal position.

DESCRIPTION OF THE PRIOR ART

The bicycle has been a mode of transportation and recreation for many years, long before the automobile was invented. There has always been a need to store the bicycle out of the way if space is limited. There have been many ideas presented that will store bicycles, however, many of these ideas still leave the bicycle in a space that must be avoided.

One such deuce is U.S. Pat. No. 557,567 to Eddy. This deuce supplies hooks that can support the frame and store the bicycle in a vertical position. The hooks my be stored horizontally when not in use.

U.S. Pat. No. 569,289 to Lynch describes clamping means that can be secured to a wall and clamp on the bicycle frame to hold the bicycle in place.

U.S. Pat. No. 3,770,133 provides a bicycle storage device similar to a vertically sliding garage door. The bicycle ends up hanging from the ceiling upside down.

U.S. Pat. No. 3,782,559 to Wright suspends hooks from a ceiling which holds a plate having two hooks to hold a bicycle frame. One must hoist the bicycle upwards to place the frame on the hooks.

U.S. Pat. No. 3,872,972 to Cummings et al which uses a combination of pulleys and a sacked weight to counter balance the bicycle weight. Tilting can be accomplished by pulleys to place the bicycle in a horizontal position.

U.S. Pat. No. 3,924,751 to Ballenger describes a bicycle hoist using two block and tackle means to lift the bicycle into a vertical position off the floor.

U.S. Pat. No. 4,392,572 to Bernard describes a bicycle storage rack attached to a vertical member. The bicycle is lifted up until the front wheel engages a hook which supports the bicycle.

U.S. Pat. No. 5,125,517 to Martinell describes a fold down bicycle rack. The bicycle can be supported with the bicycle off the ground and when not in use can be folded flat against the wall.

U.S. Pat. No. 4,116,341 to Hebda describes a device for storing bicycles in a building which consists of a rack that folds and stores the bicycles in a horizontal position.

What is needed is a retractable bicycle rack that uses spring biased means to move the bicycle to a stored horizontal position parallel to a ceiling. The present invention stores the bicycle and bicycle rack in a position that provides complete access underneath the rack.

Accordingly, a fuller understanding of the invention may be obtained from referring to the Summary of the Invention, and the Detailed Description of the Preferred Embodiment, in addition to the scope of the invention defined by the Claims taken in conjunction with the accompanying drawings.

SUMMARY OF THE INVENTION

It is the object of the present invention to provide a retractable bicycle rack to store a bicycle.

It is another object of the present invention to fasten the rack to an overhead member.

It is still another object of the present invention to place the bicycle on the rack in a vertical position and having spring power move the rack to a horizontal position.

Briefly, in accordance with the present invention, there is provided a bicycle rack having a frame with a fixed portion and a movable portion, both portions being hinged together. The fixed portion is fastened to an overhead member and the fixed portion has springs that are activated by a hinge arm fastened to the movable portion on one end and having spring retainers on the other end surrounding one end of each of the springs. When the movable portion of the rack is moved from the horizontal position to the vertical position, the springs by virtue of the hinge arm, are compressed and store spring energy. The movable portion of the bicycle rack has an over-center position of the springs which allows the movable portion of the rack to stay in a vertical position. The present invention compression springs are designed to lift one or two bicycles. However, if it is desired to lift more than two bicycles, the spring may be adjusted to provide a stronger compression force. Once the bicycle or bicycles are placed and held on the movable portion of the frame, the movable portion of the frame uses the stored spring energy to move the bicycle or bicycles to a horizontal position. Adjustments are also available where the bicycles are held on the frame to accommodate smaller or children's bicycles.

The novel features which are believed to be characteristic of the invention as to the system together with further objects and advantages thereof, will be better understood from the following description in connection with the accompanying drawings in which the presently preferred embodiments of the invention is illustrated by way of example. It is to be expressly understood, however, that the drawings are for purposes of illustration and description only, and are not intended as a definition of the limits of the invention.

DESCRIPTION OF THE DRAWINGS

In the drawings which illustrate the best mode presently contemplated for carrying out the present invention;

FIG. 1 is a side view of the retractable bicycle rack shown in the down position.

FIG. 2 is a partial from view of the retractable bicycle rack.

FIG. 3 is an expanded view of the spring retainer as shown circled in FIG. 1.

FIG. 4 is an expanded view of the adjustable vertical pins as shown as circled and indicated by IV in FIG. 1.

Figure 7:
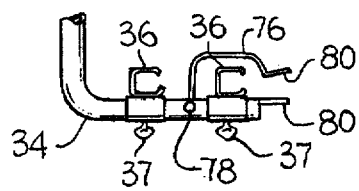
FIG. 7 is a side view of clips with one clip having means for locking.

These and other objects, features and advantages of the present invention will become more readily apparent upon detailed consideration of the following description of a preferred embodiment with reference to the accompanying drawings.

DESCRIPTION OF THE PREFERRED EMBODIMENT

Turning now to FIG. 1 there is seen a side view of the retractable bicycle rack generally shown as 10. The retractable bicycle rack has a movable frame 12 and a fixed time 14. The fixed frame 14 has two identical frame members 16 and 18 (as seen in FIG. 2) and a single time member 20. All three frame members, 16, 18 and 20 are fastened to overhead members 22 and 24 with fastening means which in the preferred embodiment are lag screws 25. The movable frame 12 has two identical frame members, 26 and 28 and a center frame member 30 (as seen in FIG. 2). The movable frame 12 also has two identical frame members 32 and 34 fastened on top of 26 and 28 respectively. Frame members 32 and 34 have slots 35 that are used to adjust frame members 32 and 34 for smaller bicycles. Also seen in FIG. 1 are clips that are used to hold the bicycle (not shown) or bicycles (not shown) on the movable frame 12. As noted there are four clips 36 which are used for either one or two bicycles which is the design of the preferred embodiment. Clips 36 may be adjusted on frame 34 and held in place by set screw 37. Also shown in FIG. 1 is a hinge arm which is a fixed link member 38. There are two fixed link members 38 (not shown in FIG. 2). However, the fixed link members 38 fastened to the movable frame 12 at 40 and are also fastened to a spring retainer 42 on the fixed frame 14. Additional detail of the spring retainer will be given in FIG. 3. FIG. 1 also shows a damper 44 that controls the movement of the movable frame 12 as it moves to a horizontal position. Also seen in FIG. 1 is spring 46. Springs 46 and 48 (as seen in FIG. 2) fit around fixed members 16 and 18, respectively. Springs 46 and 48 are compression type springs that are configured such that the spring energy will lift up to two bicycles and the movable frame from a vertical to a horizontal position. It is desired to lift more than two bicycles, sleeves 47 can be adjusted and fixed in place by set screws 49 to provide more compression force in springs 46. FIG. 1 also shows vertical pins 50 which assist in holding the bicycles or bicycles on the movable frame 12. Additional detail will be given in FIG. 4. FIG. 1 also shows frame member 29 which is adjustable vertically to accommodate smaller bicycles. Frame member 29 telescope into frame member 30 and is held by tightening clamps 31.

Turning now to FIG. 2, most of the detail described in FIG. 1 is shown in FIG. 2 which is a front view of the bicycle rack 10. The damper end connections 52 and 54 are more easily seen in this view. Also more clearly seen in this view are hinge first end 56 and hinge first end 58. In addition, hinge second end 57 and hinge second end 59 can more clearly been seen in this view. These hinges go between the movable frame 12 and the fixed frame 14.

FIG. 3 shows an expanded view to provide detail of spring retainer 42. Spring retainer 42 fits completely around fixed members 16 and 18 and its purpose is to compress springs 46 and 48 when the movable frame 12 is pulled down from a horizontal position (as shown in FIG. 6) to a vertical position (as shown in FIG. 1).

FIG. 4 shows an expanded detail of vertical pins 50 as shown in FIG. 1. As can be seen, vertical pins 50 fit into connector 60 and 62 that can slide on frame member 29. A spring 64 is between connectors 60 and 62 which are positioned by screws 66 and 68.

Figure 5:
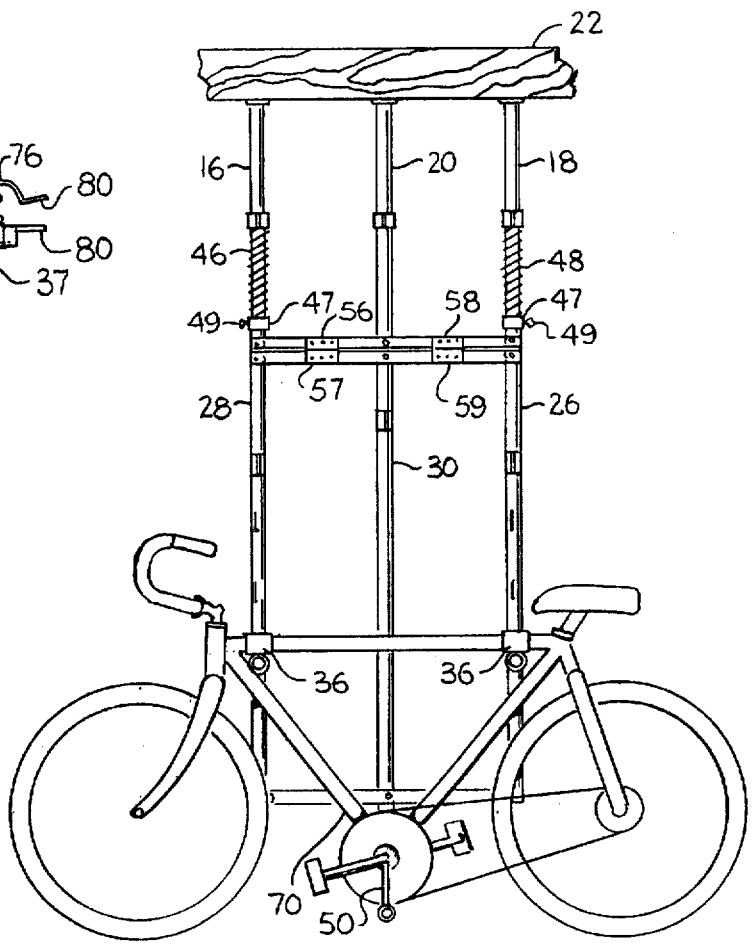
FIG. 5 is a partial from view of the retractable bicycle rack having a bicycle placed thereon.

Turning now to FIG. 5 there is seen the front view identical to FIG. 2 of bicycle rack 10 showing a bicycle 70 resting on clips 36. Pin 50 at the base of bicycle 70 can also be seen in this view.

Figure 6:
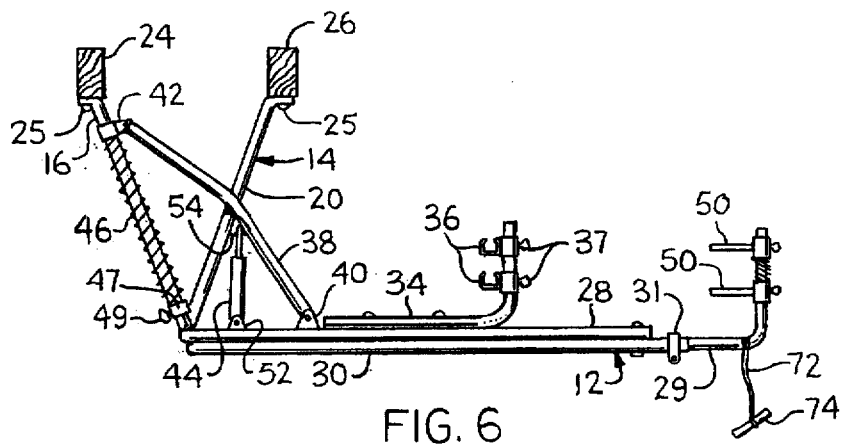
FIG. 6 is a side view of thee retractable bicycle rack shown in the up position.

FIG. 6 shows the bicycle rack 10 in the horizontal position. It is noted that the spring 46 has expanded from the vertical position. FIG. 6 shows means to pull the bicycle rack 10 from a horizontal position which is a flexible line 72 having a short perpendicular member 74 on one end.

FIG. 7 shows an additional clip 76 that can be added and rotates around a point 78 and has holes in the end 80. This additional clip 76 will prevent the theft of the bicycles.

Figure 8:
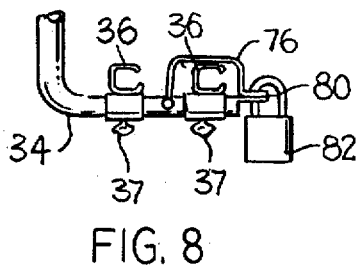
FIG. 8 is a side view of the clip in FIG. 7 with a padlock through the clip.

FIG. 8 shows the same clip 76 with a padlock 82 through holes 80. This clip 76 and padlock 82 will secure the bicycle to the bicycle rack 10.

Figure 9:
FIG. 9 is a cross section view of an elongated cylinder and small piston inside the elongated cylinder.

FIG. 9 is a cross section view of the elongated cylinder 44 and further showing small piston 45. Rod 49, which is attached to small piston 45, is also shown in this view. The elongated cylinder 44 provides restricted airflow and therefore damping when small piston 45 moves inside of elongated cylinder 44.

The operation of the bicycle rack 10 is very simple. When the bicycle 70 is moved from the horizontal position to the vertical position, springs 46 and 48 are compressed by spring retainer 42 through the motion of the fixed link members 38. Spring retainers 42 slide on frame member 16 and 18 when springs 46 and 48 are compressed. The motion of the movable frame 12 of the bicycle rack 10 toward the vertical position passes through an over-center position of the springs and when the vertical position is obtained, the movable frame 12 will stay in a vertical position. Once the bicycle or bicycles 70 are placed on the clips 36 and vertical pins 50 and both clips 36 and vertical pins 50 are adjusted, the spring force contained in the compressed springs 46 and 48 will allow the movable frame 12 to swing to the horizontal position without any outside force. The damper 44 controls the swing rate and allows the bicycle rack 12 to proceed to the horizontal position.

Thus, it is apparent that there has been provided in accordance with the invention a retractable bicycle rack that fully satisfies the objectives, aims, and advantages set forth above. While the invention has been described in conjunction with specific embodiment thereof, it is evident that many alternatives, modifications, and variations will be apparent to those skilled in the art in light of the aforegoing description. Accordingly, it is intended to embrace all such alternatives, modifications, and variations that fall without the spirit and scope of the appended Claims.

What is claimed is:

1. In a retractable bicycle rack having a frame with a fixed portion and a movable portion capable of holding at least one bicycle comprising:

a hinge having a first end attached to said movable portion of said frame and a second end attached to the fixed portion of said frame;

hinge arm means;

two compression springs being positioned around members of said fixed portion of said frame, said springs being compressed by spring retainers attached to said hinge arm means, said two compression springs being adjustable to change compression force;

attaching means to attach said fixed portion of said frame to two fixed members above said frame;

holding means to hold a bicycle on said movable portion of said frame; a linear damper to control the rate of movable frame movement from the vertical to horizontal position;

said movable portion of said frame being moved from a vertical position to receive at least one bicycle;

said movable portion of said frame being moved from a vertical position to a horizontal position by compression spring force.

2. The bicycle rack as described in claim 1 wherein said movable portion of said frame having an overcenter position of the springs holds said movable portion of said frame in a vertical position.

3. The retractable bicycle rack as described in claim 1 wherein said holding means to hold at least one bicycle on said frame is by clips and vertical pins being adjustable in a vertical direction to accommodate smaller bicycles, and said clips being also adjustable in horizontal direction.

4. The retractable bicycle rack as described in claim 1 wherein said hinge arm means is a fixed link member that is attached to said movable portion of said frame on one end and has a spring retainer surrounding the end of each compression spring on the other end.

5. The retractable bicycle rack as described in claim 4 wherein said spring retainer compresses each compression spring when said movable portion of said frame moves from a horizontal position to a vertical position after passing through an overcenter position.

6. The retractable bicycle rack as described in claim 4 wherein said spring retainer decompresses each compression spring when said movable portion of said frame moves from a vertical position to a horizontal position after passing through an overcenter position.

7. The retractable bicycle rack as described in claim 1 wherein said linear damper is a small piston inside an elongated cylinder, said cylinder having restricted air flow when said movable portion of said frame is moved from a vertical position to a horizontal position.

8. The retractable bicycle rack as described in claim 3 wherein said vertical pins are adjustable on a portion of said frame in a horizontal direction by having said vertical pins slide on a portion of said frame, said vertical pins having a spring therebetween and set screws to fix said vertical pins after adjustment.

9. The retractable bicycle rack as described in claim 3 wherein a clip is added which has locking means.

10. The retractable bicycle rack as described in claim 9 wherein said locking means consists of a clip adapted to accommodate a padlock.

11. A method of storing a bicycle on a retractable bicycle rack having a frame with a fixed portion and a movable portion, said frame capable of holding at least one bicycle comprising:

providing at least one hinge first end attached to said movable portion of said frame and at least one hinge second end attached to said fixed portion of said frame;

providing a compression spring attached to said fixed portion of said frame and a hinge arm having a spring retainer to compress said spring, said compression spring being adjustable to increase compression force;

attaching said fixed portion of said frame to a fixed member above said frame;

placing said retractable bicycle rack in a vertical position, said compression spring being compressed by said hinge arm and said spring retainer, said movable portion of said bicycle frame having an over-center position of the springs holding said movable portion of said bicycle frame in a vertical position;

holding said bicycle on said movable portion of said frame by clips and vertical pins attached to said frame;

moving said bicycle and said movable portion of said bicycle frame from a vertical position to a horizontal position by compression spring force, said compression spring force holding said bicycle and said movable portion of said frame in a horizontal position;

providing a damper to control the movement of said movable portion of said frame from a vertical position to a horizontal position.

12. The method of storing a bicycle on a retractable bicycle rack as described in claim 11 further including the steps of:

providing a locking clip attached to said movable portion of said frame;

providing a padlock to fit through said locking clip to secure said bicycle to said movable portion of said frame;

providing means to adjust said clips and said vertical pins attached to said movable portion of said frame;

providing pulling means to pull said bicycle rack from a horizontal position to a vertical position.

13. The retractable bicycle rack as described in claim 1 herein said retractable bicycle rack can accommodate at least one bicycle placed on said movable portion of said frame, said bicycle and said movable portion of said frame is moved from a vertical position to a horizontal position by compression spring force from said two compression springs whereby said two compression springs hold said movable portion of said frame and said bicycle in a horizontal position.

14. The retractable bicycle rack as described in claim 1 wherein said bicycle rack can accommodate at least one bicycle and said movable portion of said frame is moved from a horizontal position to a vertical position by pulling means and said two compression springs are simultaneously compressed whereby at least one bicycle and said movable portion of said frame maintains a vertical position by said two compression springs passing through an overcenter position.

15. The retractable bicycle rack as described in claim 14 wherein said pulling means is a flexible line having a short member perpendicular to said line on one end, said flexible line being attached to the end opposite said hinge first end of said movable portion of said frame.

* * * * *